US008960575B2

(12) United States Patent
Hasselschwert et al.

(10) Patent No.: US 8,960,575 B2
(45) Date of Patent: Feb. 24, 2015

(54) ELECTROSTATIC SPRAY SYSTEM AND METHOD

(75) Inventors: Daniel J. Hasselschwert, Sylvania, OH (US); James P. Baltz, Waterville, OH (US)

(73) Assignee: Finishing Brands Holdings Inc., Minneapolis, MN (US)

( * ) Notice: Subject to any disclaimer, the term of this patent is extended or adjusted under 35 U.S.C. 154(b) by 705 days.

(21) Appl. No.: 12/638,681

(22) Filed: Dec. 15, 2009

(65) Prior Publication Data

US 2010/0176224 A1 Jul. 15, 2010

Related U.S. Application Data

(60) Provisional application No. 61/144,420, filed on Jan. 13, 2009.

(51) Int. Cl.

| | |
|---|---|
| ***B05B 5/00*** | (2006.01) |
| ***A01G 25/14*** | (2006.01) |
| ***B65D 83/00*** | (2006.01) |
| ***B05B 5/03*** | (2006.01) |
| ***B65D 83/20*** | (2006.01) |

(52) U.S. Cl.

CPC ................ *B05B 5/03* (2013.01); *B65D 83/202* (2013.01)

USPC ....... 239/708; 239/375; 239/337; 222/402.13

(58) Field of Classification Search

USPC ...................... 239/690, 690.1, 708, 375, 337; 222/402.13, 402.15, 183

See application file for complete search history.

(56) References Cited

U.S. PATENT DOCUMENTS

| | | | | |
|---|---|---|---|---|
| 2,914,221 | A * | 11/1959 | Rosenthal | 222/146.3 |
| 4,004,733 | A | 1/1977 | Law | |
| 4,248,386 | A | 2/1981 | Morle | |
| 4,612,598 | A * | 9/1986 | Norris | 361/227 |
| 4,971,257 | A * | 11/1990 | Birge | 239/708 |
| 5,222,663 | A | 6/1993 | Noakes et al. | |
| 5,400,975 | A * | 3/1995 | Inculet et al. | 239/690.1 |
| 5,531,384 | A | 7/1996 | Greene et al. | |
| 5,582,875 | A | 12/1996 | Ryosuke | |
| 5,630,793 | A | 5/1997 | Rowe | |
| 5,904,273 | A | 5/1999 | Aspacher et al. | |
| 6,079,634 | A | 6/2000 | Noakes et al. | |
| 6,199,766 | B1 | 3/2001 | Fox et al. | |
| 6,216,966 | B1 | 4/2001 | Prendergast et al. | |

(Continued)

FOREIGN PATENT DOCUMENTS

| | | |
|---|---|---|
| JP | 63077562 | 7/1988 |
| WO | WO2008074455 | 6/2008 |
| WO | WO2008074462 | 6/2008 |

OTHER PUBLICATIONS

U.S. Appl. No. 12/714,280, filed Feb. 26, 2010, Seitz et al.

(Continued)

*Primary Examiner* — Justin Jonaitis

(74) *Attorney, Agent, or Firm* — Fletcher Yoder, P.C.

(57) ABSTRACT

In accordance with one embodiment a system is provided that includes an aerosol spray can, a receiver configured to electrically insulate the commercially available aerosol spray can, and a nozzle headpiece configured to couple to a neck portion of the aerosol spray can. Further, the nozzle headpiece is configured to electrostatically charge the aerosol spray can, and the nozzle headpiece includes an electrostatically charged passage.

19 Claims, 3 Drawing Sheets

(56) References Cited

U.S. PATENT DOCUMENTS

| | | | |
|---|---|---|---|
| 6,279,834 | B1 | 8/2001 | Fox et al. |
| 6,311,903 | B1 | 11/2001 | Gaw et al. |
| 6,318,647 | B1 | 11/2001 | Gaw et al. |
| 6,326,062 | B1 | 12/2001 | Noakes et al. |
| 6,343,714 | B1 * | 2/2002 | Tichenor .................. 222/153.11 |
| 6,482,357 | B1 | 11/2002 | Fox et al. |
| 6,592,813 | B1 | 7/2003 | Fox et al. |
| 6,612,510 | B1 | 9/2003 | Fox et al. |
| 6,682,004 | B2 | 1/2004 | Kadlubowski et al. |
| 6,814,318 | B2 | 11/2004 | Wilson et al. |
| 7,150,412 | B2 | 12/2006 | Wang et al. |
| 7,152,817 | B2 | 12/2006 | Wilson et al. |
| 7,393,385 | B1 | 7/2008 | Coffey et al. |
| 7,460,924 | B2 | 12/2008 | Alexander et al. |
| 7,815,132 | B2 | 10/2010 | Baltz |
| 2007/0194157 | A1 | 8/2007 | Golden et al. |
| 2008/0202413 | A1 | 8/2008 | Seitz et al. |
| 2010/0072309 | A1 | 3/2010 | Hodge et al. |

OTHER PUBLICATIONS

U.S. Appl. No. 12/954,525, filed Nov. 24, 2010, Bryant et al.

* cited by examiner

ELECTROSTATIC SPRAY SYSTEM AND METHOD

CROSS REFERENCE TO RELATED APPLICATION

This application is a U.S. Non-provisional Patent Application of U.S. Provisional Patent Application No. 61/144,420, entitled "Electrostatic Spray System and Method", filed Jan. 13, 2009, which is herein incorporated by reference in its entirety.

BACKGROUND

The invention relates generally to a system and method for electrostatic spray coating and, more specifically, using an aerosol can with an electrostatic spray coating system.

Aerosol spray coating systems may have a low transfer efficiency, e.g., a large portion of the sprayed coating material does not actually coat the target object. For example, a metal fence, when sprayed with an aerosol spray paint can, may only have a small portion of the paint coat the target fence, thereby wasting a large portion of the paint. Further, aerosol spray systems may also apply uneven coatings to a target object, causing an undesirable finish.

BRIEF DESCRIPTION

In accordance with one embodiment a system is provided that includes an aerosol spray can, a receiver configured to electrically insulate the commercially available aerosol spray can, and a nozzle headpiece configured to couple to a neck portion of the aerosol spray can. Further, the nozzle headpiece is configured to electrostatically charge the aerosol spray can, and the nozzle headpiece includes an electrostatically charged passage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In certain embodiments, the systems and methods described herein include an electrostatic spray system configured to utilize an off-the-shelf or commercially available aerosol can to electrostatically spray and coat a target object. For example, the electrostatic spray system may achieve about 60 to 90% transfer efficiency of a coating material, as compared to a non-electrostatic transfer efficiency of 15 to 50%. The electrostatic spray system may be configured to electrostatically charge a conductive aerosol can, thereby charging the contents of the can to enable a more efficient transfer of the material within the can to a target object. For example, a commercially available aerosol spray can, composed of an aluminum alloy, may be conductive, and therefore, capable of being electrostatically charged by the electrostatic spray system. By applying an electrostatic charge to the aerosol can, the material within the can, such as paint, is also charged. Upon being sprayed through the electrostatic spray system's nozzle, the charged paint particles within the can may be attracted to a grounded conductive target object. Therefore, the electrostatic spray system enables a more efficient transfer of the material inside the aerosol can to the target object, reducing time spent applying the material as well as paint wasted during the process.

Figure 1:
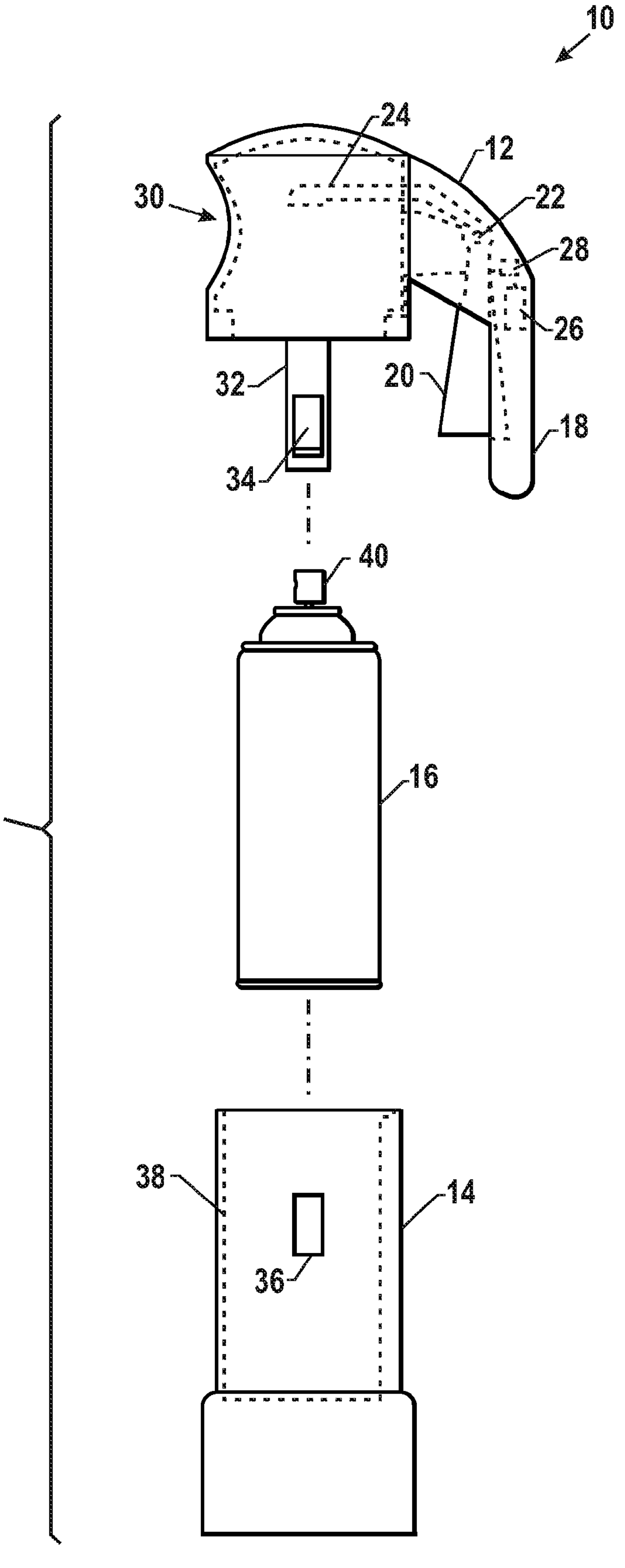
FIG. 1 is an exploded side view of an embodiment of a spray coating system, including components used to electrostatically charge an aerosol spray can.

FIG. 1 is an exploded side view of an embodiment of an electrostatic spray system 10. The electrostatic spray system 10 includes a headpiece 12 and insulating base 14. A commercially available aerosol can 16 may be placed inside the insulating base 14 when assembling the electrostatic spray system 10. The headpiece 12 may be configured to couple to the insulating base 14, thereby securing the aerosol can 16 within the electrostatic spray system 10. The headpiece 12 includes a handle portion 18, which may be held by an operator during use of the electrostatic spray system 10. For example, an operator may hold the handle portion 18 and squeeze a trigger 20 to spray the material located within the aerosol can 16 towards a target object. As depicted, the trigger 20 may extend inside the headpiece 12, wherein it is coupled to a pivot point 22 within the headpiece 12. The pivot point 22 may be a pin and hole, a spring mounted coupling, or other suitable mechanism to allow the movement of the trigger 20 to translate to other members of the electrostatic spray system 10. Movement of the trigger 20 enables movement of an actuator arm 24 due to the rotational coupling of the trigger to the pivot point 22. As discussed below, the actuator arm 24 may press down on a nozzle to actuate the spraying process.

In an exemplary embodiment, an electrostatic charge is applied to the aerosol can 16 via a power output from a battery 26 and/or other power sources e.g., a capacitor, a wire connection, or a combination thereof, and a controller 28. For example, the electrostatic spray system 10 may have a rechargeable battery 26 that may be charged by placing the system 10 or the removeable battery 26 component in a docking station. The power output may be connected to the aerosol can 16 via a lead through headpiece 12, which contacts the aerosol can 16 when assembled. As depicted, a spray opening 30 may be a hole in a wall of the headpiece 12. The headpiece 12 may be constructed of a plastic or other suitable durable non conductive material. In the embodiment, the headpiece 12 may also include latching members 32, which may be located on the opposite sides of headpiece 12. In the embodiment, a pair of latching members 32 may extend from the body of the headpiece 12. The latching members 32 may each include protrusions 34 that may be configured to latch to holes 36 that are designed to receive and couple to the protrusions 34. As illustrated by the diagram, protrusions 34 may be configured to latch or couple to holes 36 located on each side of insulating base 14, where members 32 are configured to fit inside base 14 during assembly. Accordingly, after placement of aerosol can 16 within the insulating base 14, the headpiece 12 may be latched to the insulating base 14. The latching mechanism between protrusions 34 and notches 36 may be achieved by any appropriate method.

Alternatively, the headpiece 12 and insulating base 14 may be coupled by any appropriate mechanism, including straps that may be tightened, biasing and latching members, magnets, levers, threads, and/or other fastener devices. As depicted, holes 36 may be cavities within the walls 38 of insulating base 14. In the example, the insulating base 14 may be composed of an appropriate non-conductive insulating material, such as a plastic. A target object may be sprayed by a material emitted from the aerosol can 16 through a nozzle 40. The aerosol can 16 may be a commercially available spray can available to consumers at retail or paint supply stores in 3, 5, 12, 15 ounce (oz.) or other commercially available sizes. An operator may purchase the aerosol can 16 from a retailer and replace a nozzle provided by the manufacturer with the nozzle 40 configured to work with the electrostatic spray system 10. As depicted, the assembled electrostatic spray system 10 and aerosol can 16 are self contained or stand alone unit configured to electrostatically spray a fluid without any external equipment. Accordingly, after use of the system 10 with one can 16, another aerosol can 16 may be placed in the insulating base 14 for use of the system with multiple cans. In addition, the electrostatic coating system 10 is configured to enable the electrostatically charged material to coat the grounded conductive target object, enhancing transfer efficiency and reducing waste of the coating material.

Figure 2:
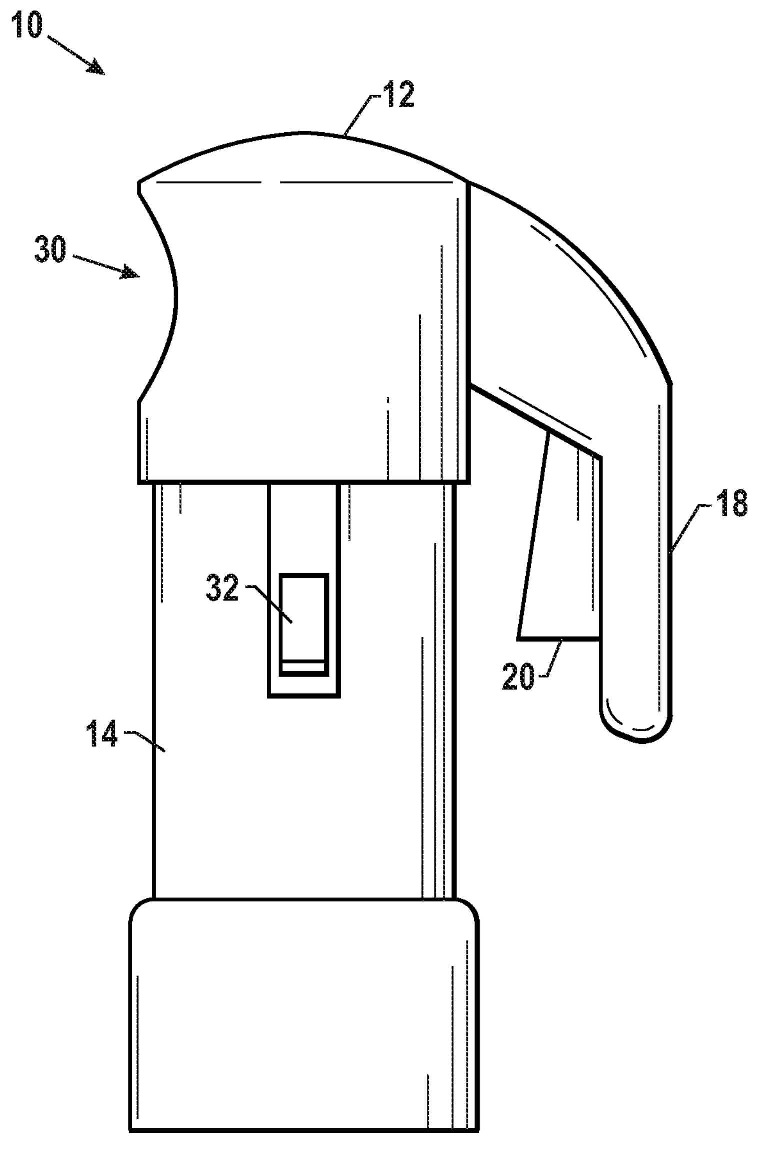
FIG. 2 is a side view of an embodiment of the system, as shown in FIG. 1, with the aerosol spray can and components assembled.

FIG. 2 is a diagram of an assembled side view of the electrostatic spray system 10 shown in FIG. 1. As illustrated, the components of the electrostatic spray system 10 have been assembled, thereby enabling the system to perform an electrostatic coating of a target object. Specifically, the headpiece 12 is coupled to the insulating base 14 via latching members 32 and/or other appropriate coupling fasteners. Further, the aerosol can 16 is placed within the insulating base 14 and headpiece 12. The nozzle 40 may also be placed adjacent an actuator of the aerosol can 16 and located beneath the actuator arm 24, enabling a spraying process to occur when trigger 20 is squeezed. In an embodiment, the headpiece 12 and insulating base 14 may be made of a similar non-conductive material, such as a plastic, thermoplastic, polyethylene, or other appropriate durable material.

Figure 3:
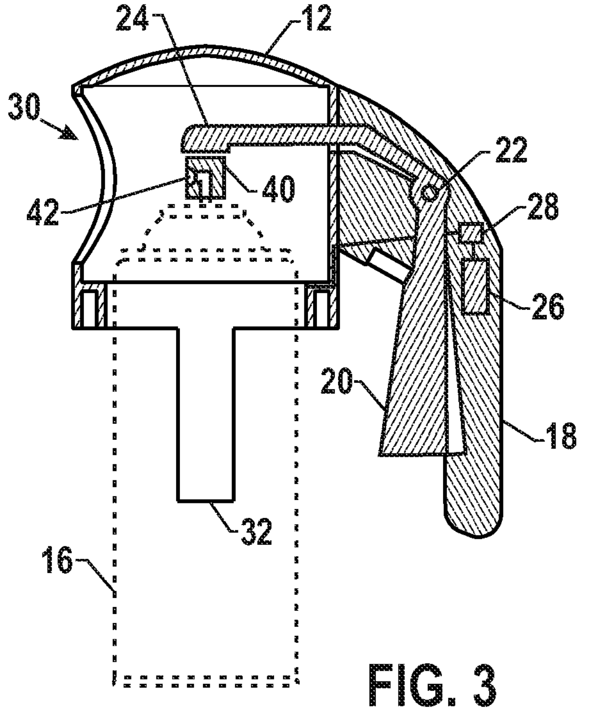
FIG. 3 is a sectional side view of an embodiment of the top portion of the system, as shown in FIG. 1, with a handle, trigger, actuator arm, and conductive nozzle portion.

FIG. 3 is a detailed sectional side view of the headpiece 12, including components used to electrostatically charge the coating material prior to or during application. As depicted, the headpiece 12 may include the handle portion 18 and trigger 20. The trigger 20 may be coupled to the member that includes, the actuator arm 24. The actuator 24 pivots about pivot point 22 upon squeezing the trigger 20. Accordingly, the actuator 24 may press down on the nozzle 40 when the trigger 20 is squeezed, thereby releasing the electrostatically charged coating material. In addition, the nozzle 40 may include a conductive passage 42, which may further electrostatically charge the coating material prior to spraying from the nozzle 40. For example, the conductive passage 42 and the nozzle 40 may be a conductive metallic material that is in contact with the aerosol can 16. The electrostatic charge applied to the aerosol can 16 may also be transmitted to the conductive passage 42. By electrostatically charging the exiting stream of coating material via the conductive passage 42, the coating material will have an increased conductive charge as it is sprayed toward a target object. Therefore, the conductive passage 42 further enhances efficiency of the electrostatic spray system 10.

Figure 4:
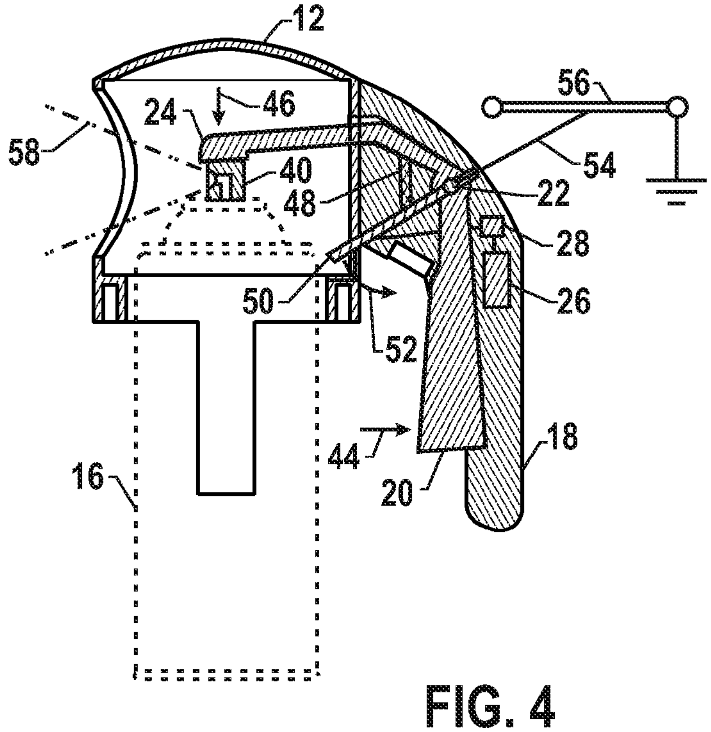
FIG. 4 is a sectional side view of an embodiment of the top portion of the system, as shown in FIG. 3, with an automatic discharge mechanism.

FIG. 4 is sectional side view of an embodiment of the headpiece 12, including components that enable the electrostatic charge to be drained from the can 16 when not in use. As depicted, trigger 20 may squeezed in direction 44 enabling the actuator arm 24 to move in direction 46, thereby pressing down on nozzle 40. As actuator arm 24 moves in direction 46, member 48, which is rigidly coupled to arm 24, presses a conductive arm 50 out of contact with a surface of aerosol can 16. As illustrated, the movement of arm 50 in direction 52 moves the conductive arm 50 out of contact with the aerosol can 16. Therefore, when trigger 20 is squeezed the conductive arm 50 is no longer connected to the aerosol can 16, thereby removing a path to ground. Specifically, when the trigger 20 is not squeezed, an electrical charge may be conducted from can 16 through the conductive arm 50 to a conductive spring 54, which is coupled to a ground bar 56. For example, the ground bar 56 may be a conductive stake (similar to a tent stake) and the conductive spring 54 may be a simple wire coupled to the grounded conductive stake. As the nozzle 40 is pressed down by actuator arm 24, the conductive arm 50 moves in direction 52, removing the path to ground, and the electrostatic charge is applied to the aerosol can 16 to charge the coating material before it is sprayed (58) through nozzle 40.

In an embodiment, the conductive arm 50 is in contact with aerosol can 16 during a non-spraying position, where trigger 20 is in a resting position. While in the resting position, the electrostatic charge sent to aerosol can 16 is dissipated through the coupled conductive component, including conductive arm 50, conductive spring member 54, and ground bar 56. Further, when in an operating mode or spraying mode, the electrostatic spray system 10 utilizes the movement of the actuator arm 24 to press conductive arm 50 via member 48 to decouple conductive arm 50 and can 16, removing a conductive path for the electrostatic charge. When in an operational or spraying mode, the electrostatic charge is conducted to the material within the aerosol can 16 due to the lack of a ground pathway for the electrostatic charge when the trigger 20 is squeezed. Further, the insulated base 38 surrounds and prevents the charged aerosol can 16 from being touched during a spraying operation. In addition, the more efficient transfer process of the electrostatic spray system 10 reduces overspray and waste of the coating material and reduces the time required to apply the coating material. Moreover, the use of a commercially available and inexpensive aerosol can 16 as a component of electrostatic spray system 10 enables an operator to perform an electrostatic spray operation at a reduced cost.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An electrostatic spray system, comprising:
a base having a receptacle configured to receive at least half of a body of a self-contained spray can;
a head separate from and removably coupled to the base over the receptacle, wherein the head is configured to receive and circumferentially surround a portion of the body of the self-contained spray can, and the head comprises a trigger configured to actuate a spray nozzle of the self-contained spray can in response to movement of the trigger; and
an electrostatic charge system configured to apply an electrostatic charge to the self-contained spray can.

2. The electrostatic spray system of claim 1, wherein the self-contained spray can is an aerosol spray can.

3. The electrostatic spray system of claim 1, comprising the self-contained spray can, wherein the self-contained spray can comprises an electrically conductive container.

4. The electrostatic spray system of claim 1, comprising an electrically conductive spray nozzle configured to fit within a fluid outlet in the self-contained spray can.

5. The electrostatic spray system of claim 1, wherein the trigger is configured to apply the electrostatic charge in response to movement of the trigger.

6. The electrostatic spray system of claim 1, wherein the electrostatic charge system comprises a battery.

7. The electrostatic spray system of claim 1, wherein the electrostatic charge system comprises a capacitor.

8. The electrostatic spray system of claim 1, wherein the base and the head are made of an electrically insulating material.

9. The electrostatic spray system of claim 1, wherein the base comprises a first latch, the head comprises a second latch, and the first and second latches couple with one another to hold the self-contained spray can between the base and the head.

10. The electrostatic spray system of claim 1, wherein the base and the head are made of an electrically insulating material, the self-contained spray can is an aerosol spray can having an electrically conductive wall, the electrostatic charge system comprises a battery disposed in the head, and the trigger is configured to apply the electrostatic charge from the battery to the electrically conductive wall in response to movement of the trigger.

11. An electrostatic spray system, comprising:
a head configured to circumferentially surround an electrically conductive wall of a body of a self-contained spray can and a spray nozzle of the self-contained spray can, wherein the head comprises an electrostatic charge system configured to apply an electrostatic charge to the electrically conductive wall of the self-contained spray can, wherein the head is configured to couple to a base that surrounds at least half of the body of the self-contained spray can, including a lower portion of the self-contained spray can.

12. The electrostatic spray system of claim 11, wherein the electrostatic charge system comprises a battery.

13. The electrostatic spray system of claim 11, wherein the electrostatic charge system comprises a capacitor.

14. The electrostatic spray system of claim 11, wherein the head comprises a trigger configured to actuate the spray nozzle of the self-contained spray can in response to movement of the trigger, and the trigger is configured to apply the electrostatic charge in response to movement of the trigger.

15. The electrostatic spray system of claim 11, comprising an electrically conductive spray nozzle configured to fit within a fluid outlet in the self-contained spray can.

16. The electrostatic spray system of claim 11, comprising the self-contained spray can, wherein the self-contained spray can is an aerosol spray can, and the self-contained spray can comprises an electrically conductive container.

17. An electrostatic spray system, comprising:
an electrically conductive spray nozzle configured to couple to a liquid outlet of a self-contained spray can, wherein the electrically conductive spray nozzle comprises a conductive material extending from a nozzle inlet to a nozzle outlet of the spray nozzle;
an electrically insulating base having a receptacle configured to receive at least half of a body of the self-contained spray can;
a head separate from and removably coupled to the base over the receptacle, wherein the head is configured to circumferentially surround a portion of the body of the self-contained spray can; and
an electrostatic charge system configured to apply an electrostatic charge to the self-contained spray can and the electrically conductive spray nozzle.

18. The electrostatic spray system of claim 17, wherein the electrostatic charge system comprises a battery, a capacitor, or a combination thereof.

19. The electrostatic spray system of claim 17, wherein the head comprises a trigger configured to actuate the electrically conductive spray nozzle of the self-contained spray can in response to movement of the trigger, and the trigger is configured to apply the electrostatic charge in response to movement of the trigger.

* * * * *